Jan. 26, 1943.   H. P. PHILLIPS   2,309,477
PISTON RING
Filed Jan. 31, 1941
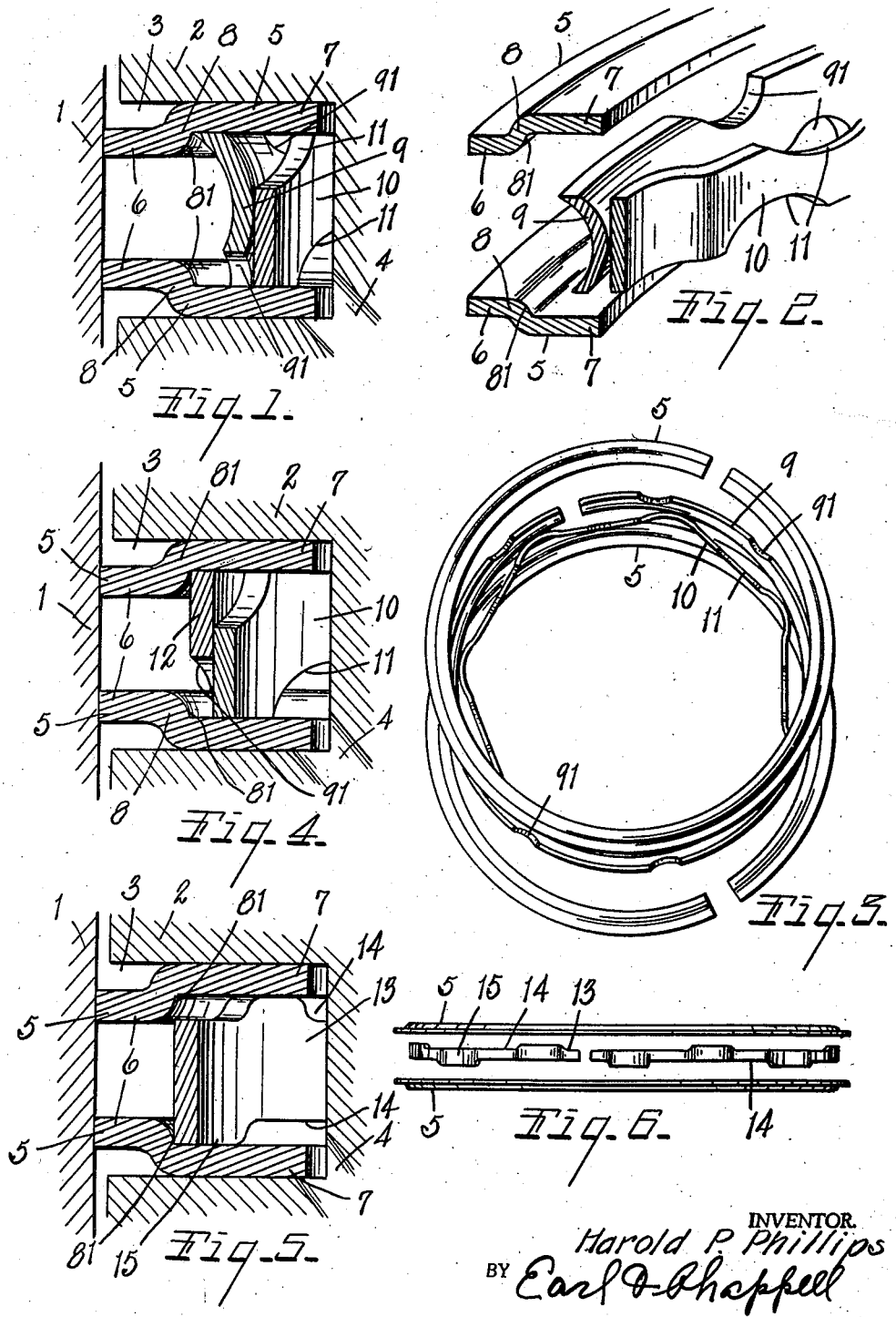
INVENTOR.
Harold P. Phillips
BY Earl D. Chappell
ATTORNEYS.

Patented Jan. 26, 1943

2,309,477

UNITED STATES PATENT OFFICE 2,309,477

PISTON RING

Harold P. Phillips, Hastings, Mich., assignor to Hastings Manufacturing Company, Hastings, Mich.

Application January 31, 1941, Serial No. 376,863

3 Claims. (Cl. 309—45)

This invention relates to improvements in piston rings.

The main objects of this invention are:

First, to provide a piston ring assembly in which the parts are all formed of ductile metal such for example as ribbon steel, and at the same time the ring is efficient and quite economical to produce.

Second, to provide a ring assembly of the type described in which the cylinder wall contacting elements or members are supported for independent radial movement or for individual cylinder wall engaging action, and at the same time under relatively high unit pressure or tension.

Objects pertaining to details and economies of the invention will definitely appear from the description to follow. The invention is described and pointed out in the claims.

A structure which embodies the features of the invention is clearly illustrated in the accompanying drawing in which:

Fig. 1 is an enlarged fragmentary view in vertical section of an oil ring assembly embodying my invention as installed in a piston ring groove and in relation to a cylinder, no attempt being made to show the relative proportions of the parts, clearance, or the like.

Fig. 2 is a fragmentary perspective view showing parts of the ring in separated or exploded relation.

Fig. 3 is a perspective view showing the ring parts of the embodiment of Figs. 1 and 2 in separated or exploded relation.

Fig. 4 is an enlarged fragmentary sectional view illustrating a modified form or embodiment of my invention.

Fig. 5 is an enlarged fragmentary sectional view illustrating a still further embodiment of my invention.

Fig. 6 is an edge view of the embodiment of my invention shown in Fig. 5 in separated or exploded relation.

My present invention relates to a composite ring assembly of the type illustrated in my Patent No. 2,148,997, issued February 28, 1939. In all of the embodiments of my present invention here illustrated, all of the elements are fabricated of thin ribbon-like ductile metal, the cylinder wall engaging elements being as in my said patent of steel or hard wear-resisting material. The other parts may also be suitably made of steel. Bronze, brass or other ductile metal which permits ready formation may be used for certain of the parts. In the accompanying drawing, no attempt has been made to illustrate the parts in their proportions or to show clearance between the parts of the assembly, or the assembly relative to the piston ring groove.

The reference numeral 1 indicates the cylinder wall of an internal combustion engine and 2 a piston including a piston ring groove 3 having drain openings 4. While the piston ring assembly of my invention is especially desirable for use as an oil ring, it may be used as a compression or scraper ring, in which case, of course, the oil drainage openings would not be required.

The assembly of my present invention comprises a pair of thin split annular ribbon-like cylinder wall engaging segments or elements 5 formed of ribbon steel or other ductile wear-resisting material. These cylinder wall contacting members 5 are conformed to provide inwardly offset outer portions 6 and inner portions 7, the offsets 8 providing annular abutments or shoulders 81. It will be noted that the inner portions 7 are parallel and are in sliding relation to the sides of the piston ring groove while the outer portions 6 are inwardly offset, that is, offset toward each other, in this embodiment approximately the thickness of the stock from which the members 5 are formed, and .024 of an inch is a gauge of stock that may be used with satisfactory results. This offsetting may be done at the mill or thereafter, as desired, although it is desirable that it be done in a manner to produce substantially uniform results within allowable working tolerances.

While the side members 5 have some inherent resiliency, my invention contemplates the use of a spring expander which, being arranged to extend between the side members, constitutes both a spacer member and an expander. In the preferred embodiment shown in Fig. 1 I provide an intermediate or spacer member 9 which is formed of ductile metal and is preferably of concavo-convex cross section or curved cross section as shown in Figs. 1, 2 and 3. This member 9 is arranged in edge abutting relation to the inner portions 7 of the side members 5 and in engagement with the shoulders or abutments 81. When the assembly is desired for use as an oil ring, the member 5 is provided with drain openings or notches 91.

The expander 10 is preferably of the annular crimped type and is provided with drain openings or recesses 11. This expander rests on the bottom of the piston ring groove with the crimps thereof extending between the inner portions 7 of the ring into supporting engagement with the intermediate spacer member 9. The concavo-convex cross section of the spacer member 9 stiffens the same and also provides a rocking surface in engagement with the expander, minimizing the area of contact between the expander and the spacer and thus minimizing wear on the expander, which materially reduces the effective life thereof. This rocking engagement facilitates the independent movement of the side members which is a very desirable feature of the structure, particularly when the piston ring assembly is used in tapered or worn cylinders.

In the embodiment shown in Fig. 4, the spacer member 12 is of flat section. While it permits substantial freedom of independent movement of the side members, it is not as fully adjustable as the preferred embodiment. The expander spring 10 further serves as a spacer member and in the embodiment shown in Fig. 5 the expander 13 directly engages the side members 5. In this embodiment, where the structure is intended to be used as an oil ring, the oil drain recesses 14 are provided in the edges of the expander with substantial intermediate or lug portions 15 which engage the abutments 81.

In all of the embodiments the cylinder wall engaging members or side members are supported for free and independent movement relative to each other, and the expander may be of conformation differing quite materially from expanders of the type in which the expanders engage the inner edges of the cylinder wall engaging members, or, in other words, must lie between the bottom of the groove and the inner edges of the cylinder contacting members. This permits forming the expander of relatively long bowed spring portions, and, further, permits the use of side members of somewhat greater radial thickness than would be practical in the event the spring engages the inner edges of the cylinder contacting members.

In all of these embodiments a feature of substantial importance is the ease and economy with which the cylinder wall engaging members 5 may be produced by a rolling operation, preferably in the steel mill.

It will be noted that the inward offsetting of the side members 5 at 6 results in the formation of annular outer recesses of appreciable axial dimension adjacent the upper and lower edges of the piston ring groove 3. This feature is of substantial merit when the assembly of my invention is installed in a worn cylinder, for in case the structure is employed in the compression ring groove of the piston it provides clearance preventing the ring assembly from striking the annular overhanging shoulders which are frequently found in worn cylinders at the upper extremity of the compression ring travel therein. Similar shoulders are likewise sometimes found at the lower extremity of the stroke of the lowermost ring, which is usually an oil ring, so that the lower annular recess found by the upward offsetting of the bottom side member 5 has the advantage of avoiding interference with or striking such a shoulder when the assembly is used as a composite oil ring. Thus, the need for preliminarily machining the cylinder prior to installation of new rings, which is commonly performed to remove such wear-produced shoulders, is eliminated.

I have illustrated and described my invention in embodiments which I regard as very satisfactory. I have not attempted to illustrate or describe other embodiments which I contemplate as it is believed this disclosure will enable the adaptation of my invention as may be desired.

Having thus described my invention what I claim as new and desire to secure by Letters Patent is:

1. A piston ring assembly comprising axially spaced thin split annular ribbon-like cylinder wall engaging members formed of ribbon steel having the outer portions thereof axially offset relative to the inner portions thereof providing inner portions disposed in parallel planes and outer portions disposed in planes offset axially toward each other from their inner portions, the offsets providing facing annular abutments, a split annular combined spacing and thrust transmitting intermediate member disposed between said cylinder wall engaging members and in axially spacing relation thereto and in cooperating relation to said abutments thereof to exert radial expanding force thereon, and an expander disposed between said cylinder wall engaging members, said intermediate member having rockable supported engagement with said expander in radially compressed condition of the latter and exerting radial expansive thrust individually and independently on said first named members, derived from the expansive force of said expander.

2. A piston ring assembly comprising axially spaced thin split annular rib-like cylinder wall engaging members of ductile metal having intermediate the radial dimensions thereof axial offsets providing facing annular abutments, an annular combined spacing and thrust transmitting intermediate member disposed between said cylinder wall engaging members in axially spacing relation thereto and in cooperating relation to said abutments thereof, said spacing member being of concavo-convex cross section and disposed facing outwardly, and an expander disposed between said cylinder wall engaging members and in supporting engagement with the convex side of said intermediate member, said intermediate member being rockable on said expander to transmit the radial thrust thereof to said cylinder wall engaging members in a manner permitting independent radial movement thereof.

3. A piston ring assembly adapted to be disposed in a piston groove comprising axially spaced split annular cylinder wall engaging members formed of ribbon-like ductile metal disposed to present their edges to a cylinder wall, each said member having an axially disposed annular offset therein providing an inwardly facing annular shoulder, an annular split intermediate ductile metal member engageable with the bottom of said groove disposed edgewise between said side members to coact with said shoulders, and an expander disposed between said wall engaging members to coact with said intermediate member and acting to urge the same against said shoulders of said members said intermediate member having rockable supported engagement with said expander in radially compressed condition of the latter against the bottom of said groove and said intermediate member transmitting radial thrust from the expander individually and independently to said first named members.

HAROLD P. PHILLIPS.